J. ADAMS.
Fruit Jar.

No. 35,286.

Patented May 20, 1862.

Witnesses:
J. W. Coombs
G. W. Reed

Inventor:
John Adams
per Munn & Co
Attorneys

UNITED STATES PATENT OFFICE.

JOHN ADAMS, OF PITTSBURG, PENNSYLVANIA.

IMPROVEMENT IN PRESERVE-VESSELS.

Specification forming part of Letters Patent No. 35,286, dated May 20, 1862.

*To all whom it may concern:*

Be it known that I, JOHN ADAMS, of Pittsburg, in the county of Allegheny and State of Pennsylvania, have invented a new and useful Improvement in Preserve-Vessels; and I do hereby declare that the following is a full, clear, and exact description of the same, reference being had to the accompanying drawings, forming part of this specification, in which—

Figure 1:
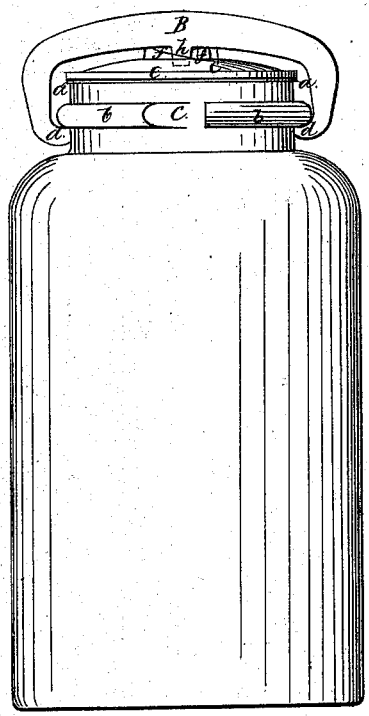
Figure 2:
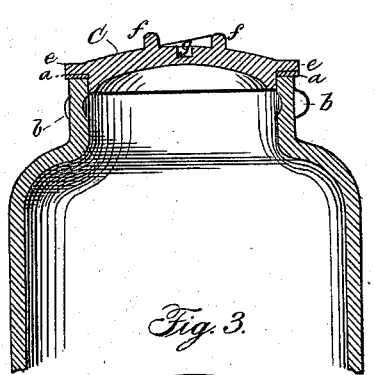

Figure 1 is a side view of a jar with my improvement; Fig. 2, a central section of the neck and cover, and Fig. 3 a top view of the jar complete.

Similar letters of reference indicate corresponding parts in the several figures.

To enable others to make and use my invention, I will proceed to describe it with reference to the drawings.

Figure 3:
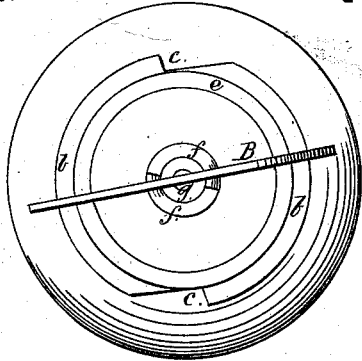

The drawings represent a glass jar with a glass cover; but both may be made of earthenware or metal, or the vessel may be made of metal with a glass or earthen cover, or vice versa. The neck of the vessel is made flat at the top for the reception of the india-rubber gasket $a$, by which the sealing is to be effected, and the fixed collar $b$, under which the yoke B, is to hook, is at a short distance from the top of the neck, and its under side is parallel with the top of the neck. The notches or recesses $c\ c$, provided in the said collar for the passage through it of the hooks $d\ d$ of the yoke B, are shown in Figs. 1 and 3. The cover C is made to fit loosely inside the neck to keep it in place, with a flat flange, $e$, to rest upon the gasket $a$.

$f\ f$ are the two wedge-like projections on the top of the cover, and $g$ is a small circular recess in the center of the exterior of the same. The projections $f\ f$ are in the form of arcs concentric with the circular margin of the cover and with the recess $g$.

The yoke B may be made of a flat piece of sheet metal cut out to the proper form, or may be made of cast-iron or brass. Its general form is that of an arch or bow with its ends turned inward to form the hooks $d\ d$ to hook under the collar $b$ of the neck, while it rests upon the projections $f\ f$ of the cover. At the middle of the yoke B there is on its under or inner side a teat-like projection, $h$, to enter the recess $g$ in the cover. The said projection $h$ and recess $g$ are not indispensable, but serve as guides for putting on the yoke exactly across the center of the cover.

To secure the cover when put on the vessel, the yoke is placed over it with the hooks $d\ d$ opposite the notches $c\ c$ of the collar $b$ and then turned, bringing the hooks $d\ d$ under the collar $b$, and moving the upper part of the yoke up the inclined projections $f\ f$, which, acting like wedges, draw the hooks tightly up under the collar and draw the cover down tightly upon the gasket.

I do not claim the projection $h$ on the yoke, nor the recess $g$ in the cover; but

What I claim as my invention, and desire to secure by Letters Patent, is—

The construction of the cover C with wedge-shaped projections $f\ f$, in combination with the yoke B and the neck of the jar, as herein shown and described.

JOHN ADAMS.

Witnesses:
   THOS. D. BELL,
   HOWARD MORTON.